(12) United States Patent
Sahai et al.

(10) Patent No.: US 8,411,798 B2
(45) Date of Patent: Apr. 2, 2013

(54) REDUCING RECEIVER POWER DISSIPATION

(75) Inventors: Aakash Sahai, Centennial, CO (US); David Meyer, Lakewood, CO (US)

(73) Assignee: ViaSat, Inc., Carlsbad, CA (US)

( * ) Notice: Subject to any disclaimer, the term of this patent is extended or adjusted under 35 U.S.C. 154(b) by 953 days.

(21) Appl. No.: 12/265,618

(22) Filed: Nov. 5, 2008

(65) Prior Publication Data

US 2010/0112974 A1    May 6, 2010

(51) Int. Cl.
    *H04L 27/00* (2006.01)
(52) U.S. Cl. ........ 375/324; 375/136; 375/316; 375/340; 725/49; 725/62; 725/68; 725/85; 725/100; 725/139; 725/151
(58) Field of Classification Search ............ 375/240.01–240.29, 136, 316–352, 375/147, 358; 370/210; 714/781; 455/334; 725/37, 49, 62–72, 85, 89, 100, 131, 139, 725/151
See application file for complete search history.

(56) References Cited

U.S. PATENT DOCUMENTS

| | | |
|---|---|---|
| 4,041,397 A | 8/1977 | Bauer et al. |
| 4,287,598 A | 9/1981 | Langseth et al. |
| 4,858,229 A | 8/1989 | Rosen et al. |
| 4,910,792 A | 3/1990 | Takahata et al. |
| 5,465,410 A | 11/1995 | Hiben et al. |
| 5,517,250 A | 5/1996 | Hoogenboom et al. |
| 5,550,550 A | 8/1996 | Das |
| 5,839,050 A | 11/1998 | Baehr et al. |
| 5,898,681 A | 4/1999 | Dutta |
| 5,987,233 A | 11/1999 | Humphrey |
| 5,991,306 A | 11/1999 | Burns et al. |
| 5,991,622 A | 11/1999 | Henry, Jr. |

(Continued)

FOREIGN PATENT DOCUMENTS

| | | |
|---|---|---|
| CN | 101584130 A | 11/2009 |
| EP | 0762637 | 3/1997 |

(Continued)

OTHER PUBLICATIONS

Data Over Cable Service Interface Specifications (DOCSIS 3.0): Physical Layer Specification, May 22, 2008. Available from www.cablemodem.com. Downloaded on Oct. 9, 2008.

(Continued)

*Primary Examiner* — Sath V Perungavoor
*Assistant Examiner* — Nathnael Aynalem
(74) *Attorney, Agent, or Firm* — Holland & Hart LLP

(57) ABSTRACT

Disclosed is a method of controlling a receiver. A group identifier or modulation and coding scheme is sent in a physical layer header. This group identifier or modulation and coding scheme, or both, determine whether the corresponding physical layer frame should be fully demodulated and decoded. If it is not necessary to fully demodulate and decode the physical layer frame, the receiver may disable its demodulator, decoder, or both. This results in a power savings. A hub device sends the group identifier or modulation and coding scheme in the physical layer header. This allows receivers that are not addressed by the group identifier, or modulation and coding scheme, to disable at least a portion of their circuitry. Disabling at least a portion of circuitry saves power consumption and dissipation. The hub device may also send control messages to tell the receiver which group identifiers, or modulation and coding schemes, they should respond to.

20 Claims, 7 Drawing Sheets

U.S. PATENT DOCUMENTS

| | | | |
|---|---|---|---|
| 6,047,171 | A | 4/2000 | Khayrallah et al. |
| 6,169,513 | B1 | 1/2001 | Cohen |
| 6,434,609 | B1 | 8/2002 | Humphrey |
| 6,442,598 | B1 | 8/2002 | Wright et al. |
| 6,487,183 | B1 | 11/2002 | Lo et al. |
| 6,511,020 | B2 | 1/2003 | Higgins |
| 6,546,488 | B2 | 4/2003 | Dillon et al. |
| 6,601,090 | B1 | 7/2003 | Gurijala et al. |
| 6,618,751 | B1 | 9/2003 | Challenger et al. |
| 6,658,463 | B1 | 12/2003 | Dillon et al. |
| 6,678,791 | B1 | 1/2004 | Jacobs et al. |
| 6,735,188 | B1 | 5/2004 | Becker et al. |
| 6,763,006 | B1 | 7/2004 | Lockett |
| 6,847,626 | B1 | 1/2005 | Carneal et al. |
| 6,865,609 | B1 | 3/2005 | Gubbi et al. |
| 6,937,580 | B2 | 8/2005 | Heatwole et al. |
| 6,947,440 | B2 | 9/2005 | Chatterjee et al. |
| 6,985,725 | B2 | 1/2006 | Berger |
| 7,027,454 | B2 | 4/2006 | Dent |
| 7,039,683 | B1 | 5/2006 | Tran et al. |
| 7,113,743 | B2 | 9/2006 | Karabinis |
| 7,142,809 | B1 | 11/2006 | Godwin |
| 7,149,526 | B2 | 12/2006 | Karabinis et al. |
| 7,203,204 | B2 | 4/2007 | Carneal et al. |
| 7,289,062 | B2 | 10/2007 | Hudson et al. |
| 7,336,967 | B2 | 2/2008 | Kelly et al. |
| 7,359,395 | B2 | 4/2008 | Toporek et al. |
| 7,415,001 | B2 | 8/2008 | Naguleswaran et al. |
| 7,450,914 | B2 | 11/2008 | Valdivia et al. |
| 7,516,236 | B2 | 4/2009 | Walsh et al. |
| 7,746,758 | B2 * | 6/2010 | Stolpman ............ 370/203 |
| 2001/0009034 | A1 | 7/2001 | Lee |
| 2001/0052015 | A1 | 12/2001 | Lin et al. |
| 2002/0006116 | A1 | 1/2002 | Burkhart |
| 2002/0021678 | A1 | 2/2002 | Heatwole et al. |
| 2002/0031120 | A1 | 3/2002 | Rakib |
| 2002/0032003 | A1 | 3/2002 | Avitzour et al. |
| 2002/0073167 | A1 | 6/2002 | Powell et al. |
| 2002/0080070 | A1 | 6/2002 | Harles et al. |
| 2002/0143984 | A1 | 10/2002 | Hudson Michel |
| 2003/0027522 | A1 | 2/2003 | Valdivia et al. |
| 2003/0039218 | A1 | 2/2003 | Kwak |
| 2003/0073435 | A1 | 4/2003 | Thompson et al. |
| 2004/0023658 | A1 | 2/2004 | Karabinis et al. |
| 2004/0111746 | A1 | 6/2004 | Hoang |
| 2004/0117499 | A1 | 6/2004 | Liu et al. |
| 2004/0157560 | A1 | 8/2004 | Yamasaki |
| 2004/0158857 | A1 | 8/2004 | Finseth et al. |
| 2004/0224633 | A1 | 11/2004 | Coromina et al. |
| 2005/0047366 | A1 | 3/2005 | Ghosh et al. |
| 2005/0226418 | A1 | 10/2005 | Lee et al. |
| 2006/0018340 | A1 | 1/2006 | Tamura |
| 2006/0239264 | A1 | 10/2006 | Kang et al. |
| 2007/0037512 | A1 | 2/2007 | Godwin |
| 2007/0116151 | A1 * | 5/2007 | Thesling ............ 375/326 |
| 2007/0150796 | A1 * | 6/2007 | Kim et al. ............ 714/781 |
| 2007/0268933 | A1 | 11/2007 | Wu et al. |
| 2007/0286422 | A1 | 12/2007 | Cocchi et al. |
| 2008/0056176 | A1 | 3/2008 | Hudson |
| 2008/0056189 | A1 | 3/2008 | Hudson et al. |
| 2008/0192622 | A1 * | 8/2008 | Scheim et al. ............ 370/210 |
| 2009/0022085 | A1 | 1/2009 | Dankberg et al. |
| 2009/0022086 | A1 | 1/2009 | Dankberg et al. |
| 2009/0022087 | A1 | 1/2009 | Dankberg et al. |
| 2009/0081946 | A1 | 3/2009 | Dankberg et al. |
| 2009/0092037 | A1 | 4/2009 | Hadad |
| 2009/0129334 | A1 | 5/2009 | Ma et al. |
| 2009/0213967 | A1 * | 8/2009 | Yeh ............ 375/341 |

FOREIGN PATENT DOCUMENTS

| | | |
|---|---|---|
| EP | 0 837 569 | 4/1998 |
| EP | 1294139 A | 3/2003 |
| GB | 1 223 163 | 2/1971 |
| WO | WO 99/18678 | 4/1999 |
| WO | WO 99/63711 | 12/1999 |
| WO | WO 00/46682 | 8/2000 |
| WO | WO 04/002016 | 12/2003 |
| WO | WO 2005/067367 | 7/2005 |
| WO | WO 2008/027974 | 3/2008 |
| WO | WO-2008097367 A | 8/2008 |

OTHER PUBLICATIONS

Digital Video Broadcasting (DVB);Second generation framing structure, channel coding and modulation systems for Broadcasting, Interactive Services, News Gathering and other broadband satellite applications, (draft ETSI EN 302 307) version 1.1.1, Jun. 2004. Available from www.etsi.org. Downloaded on Oct. 9, 2008.

Digital Video Broadcasting (DVB);Second generation framing structure, channel coding and modulation systems for Broadcasting, Interactive Services, News Gathering and other broadband satellite applications, (ETSI EN 302 307) version 1.1.2, Jun. 2006. Available from www.etsi.org. Downloaded on Oct. 9, 2008.

U.S. Appl. No. 11/847,006, filed Aug. 29, 2007.
U.S. Appl. No. 60/840,809, filed Aug. 29, 2006.
U.S. Appl. No. 61/100,206, filed Sep. 25, 2008.
U.S. Appl. No. 11/847,064, filed Aug. 29, 2007.
U.S. Appl. No. 11/847,102, filed Aug. 29, 2007.
U.S. Appl. No. 11/847,084, filed Aug. 29, 2007.
U.S. Appl. No. 11/847,121, filed Aug. 29, 2007.
International Search Report and Written Opinion of the International Searching Authority; International Application No. PCT US2007/077124; filed Jul. 22, 2008.
Patent Abstracts of Japan; vol. 012, No. 461 (E-689), Dec. 5, 1988, and JP 63 185129 A (NEC Corp), Jul. 30, 1988 (see abstract).
U.S. Appl. No. 61/091,984, filed Aug. 26, 2008.
U.S. Appl. No. 12/544,130, filed Aug. 19, 2009.
U.S. Appl. No. 61/095,979, filed Sep. 11, 2008.
Patent Abstracts of Japan; vol. 012, No. 452 (E-687), Nov. 28, 1988, and JP 63 179629 A (Nippon Telegr & Teleph Corp), Jul. 23, 1988 (see abstract).
International Search Report dated Nov. 28, 2008, Int'l Pat. App. No. PCT/US2007/079517, 2 pgs.
International Preliminary Report on Patentability dated Apr. 7, 2009, Int'l Pat. App. No. PCT/US2007/079517, 6 pgs.
Notice of Allowance dated Apr. 25, 2012, U.S. Appl. No. 12/174,525, 20 pgs.
Interview Summary dated Mar. 13, 2012, U.S. Appl. No. 12/174,525, 3 pgs.
Final Office Action dated Jan. 31, 2012, U.S. Appl. No. 12/174,525, 20 pgs.
Non-final Office Action dated Aug. 4, 2011, U.S. Appl. No. 12/174,525, 23 pgs.
Corrected Notice of Allowance dated May 15, 2012, U.S. Appl. No. 12/174,173, 2 pgs.
Notice of Allowance dated Apr. 11, 2012, U.S. Appl. No. 12/174,173, 8 pgs.
Interview Summary dated Apr. 3, 2012, U.S. Appl. No. 12/174,173, 3 pgs.
Non-final Office Action dated Dec. 28, 2011, U.S. Appl. No. 12/174,173, 16 pgs.
Non-final Office Action dated Jun. 9, 2011, U.S. Appl. No. 12/174,173, 17 pgs.
Notice of Allowance dated May 2, 2012, U.S. Appl. No. 12/174,196, 7 pgs.
Notice of Allowance and Examiner-initiated Interview Summary dated Apr. 3, 2012, U.S. Appl. No. 12/174,196, 5 pgs.
Notice of Allowance and Examiners Amendment dated Mar. 27, 2012, U.S. Appl. No. 12/174,196, 5 pgs.
Interview Summary dated Mar. 13, 2012, U.S. Appl. No. 12/174,196, 3 pgs.
Final Office Action dated Jan. 4, 2012, U.S. Appl. No. 12/174,196, 17 pgs.
Non-final Office Action dated Jul. 20, 2011, U.S. Appl. No. 12/174,196, 17 pgs.
Communication Pursuant to Article 94(3) dated Oct. 7, 2009, for EP Pat. App. No. 07872771.6, 4 pgs.

* cited by examiner

REDUCING RECEIVER POWER DISSIPATION

BACKGROUND OF THE INVENTION

The rapid growth in the internet, internet content, and networked communication in general has fueled demand for faster communication to homes and businesses. However, installing new Ethernet or fiber optic cable to every home and business served by a communication company appears to be prohibitively expensive. This is the so-called "last mile" problem.

To facilitate the use of digital communication, a series of standards were developed and promulgated. These standards are known by the acronym DVB. DVB stands for Digital Video Broadcasting. However, DVB standards can be used for communicating all kinds of data. Some of the specifications aim at the installation of bi-directional communication channels, for example, using cable or satellite installations. One of the strengths of DVB technology lies in the fact that it enables the point-to-multipoint transmission of very large amounts of data at high data rates while protecting them against transmission errors. The data may be digitized audio and video, but in many applications the data will be files such as the content of web pages. The DVB standards may include specifications for various aspects of communication including processes for registering on a bi-directional network, carrier modulation, frequency bands of operation, and message formats.

SUMMARY OF THE INVENTION

An embodiment of the invention may therefore comprise a method of controlling a receiver, comprising: receiving a first frame header comprising a first indicator and a first group identifier, said first indicator corresponding to a first modulation and coding scheme; based on said first group identifier, demodulating and decoding a first frame according to said first modulation and coding scheme; receiving a second frame header comprising a second group identifier; and, based on said second group identifier, preventing at least a portion of a second frame from being demodulated a decoded.

An embodiment of the invention may therefore further comprise a method of controlling a receiver, comprising: receiving a first frame header comprising a first indicator, said first indicator corresponding to a first modulation and coding scheme; based on said first indicator, demodulating and decoding a first frame according to said first modulation and coding scheme; receiving a second frame header comprising a second indicator, said second indicator corresponding to a second modulation and coding scheme; and, based on said second indicator, deactivating at least a portion of said receiver such that at least a portion of a second frame is not demodulated a decoded.

An embodiment of the invention may therefore further comprise a method of controlling a receiver, comprising: sending a first frame header comprising a first indicator and a first group identifier, said first indicator corresponding to a first modulation and coding scheme; and, sending a second frame header comprising a second group identifier.

DETAILED DESCRIPTION OF THE EMBODIMENTS

In an embodiment, a group identifier or modulation and coding scheme is sent in a physical layer header. This group identifier or modulation and coding scheme, or both, determine whether the corresponding physical layer frame should be fully demodulated and decoded. If it is not necessary to fully demodulate and decode the physical layer frame, the receiver may disable its demodulator, decoder, or both. This results in a powers savings. A hub device sends the group identifier or modulation and coding scheme in the physical layer header in order to allow receivers that are not addressed by the group identifier, or modulation and coding scheme, to disable at least a portion of their circuitry and thus save power. The hub device may also send control messages to tell the receiver which group identifiers, or modulation and coding schemes, they should respond to.

Figure 1:
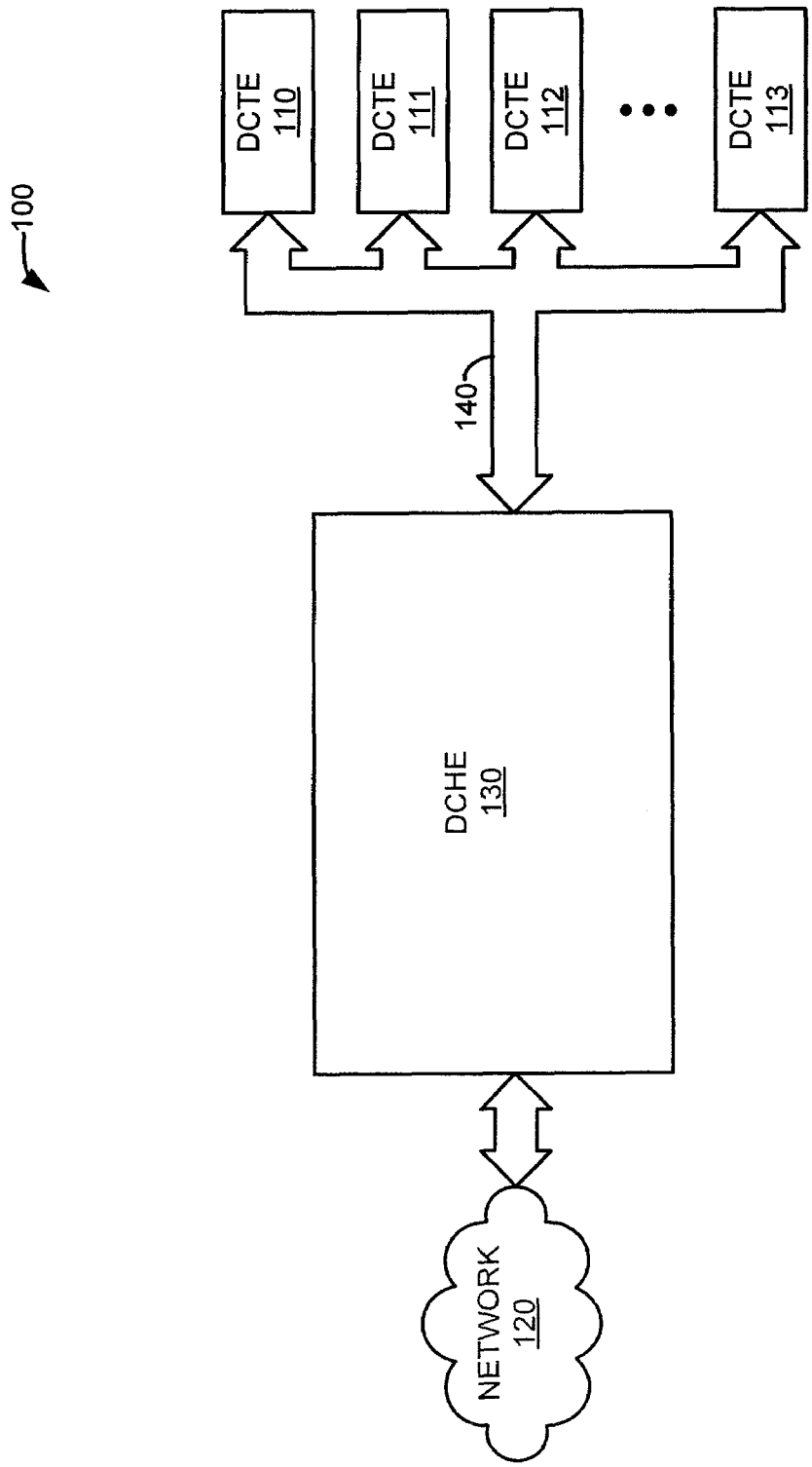
FIG. 1 is a block diagram of a communication system.

FIG. 1 is a block diagram of a communication system. In FIG. 1, communication system 100 comprises: data communication terminal equipment (DCTE) 110, DCTE 111, DCTE 112, DCTE 113, network 120, data communication hub equipment (DCHE) 130, and shared medium 140. Network 120 is operatively coupled to DCHE 130. DCTE 110-113 are operatively coupled to DCHE 130 via shared medium 140. Thus, DCTE 110-113 may be operatively coupled to network 120 via shared medium 140 and DCHE 130.

Network 120 could be any network or collection of networks that couple, link, or otherwise operatively connect DCHE 130 with other computer systems or networks. In addition, other secondary data networks could be used. In an example, network 120 may include a backhaul network, a local network, a long distance network, a packet network, the internet, a hybrid fiber-coax (HFC) network, or any combination thereof, as well as other types of networks.

DCTE 110-113 may be any device, system, or other such communication platform capable of communicating with DCHE 130 via shared medium 140. DCTE 110-113 may be, for example, a cable modem, a satellite modem, a mobile phone, a wireless phone, a wireless modem, a wireless USB modem, a personal digital assistant (PDA), as well as other types of devices or systems that can communicate with DCHE 130 via shared medium 140.

The operative coupling of DCTE 110-113, DCHE 130, and network 120 may be described by a reference model for communications and network protocol design. This description may be referred to as the TCP/IP or Internet reference model and include six layers. These layers, which are all operatively coupled, may be referred to as the physical layer (PHY), the data link layer, the medium access control (MAC) layer, the network/internet layer, the transport layer, and the application layer. Shared medium 140 may be the physical layer that operatively couples DCTE 110-113 with DCHE 130. In an example, shared medium 140 may be a wireless link that is relayed via a satellite. Thus, DCTE 110-113 may be satellite modems. In another example, shared medium 140 may be a cable-TV network. In this example, DCTE 110-113 would be cable modems. Shared medium 140 may be shared among DCTE 110-113 and DCHE 130 using time division multiplex (TDM) techniques.

DCHE 130 may be device, system, or other such communication platform capable of passing communications to and from network 120 to and from DCTE 110-113 via shared medium 140. DCHE 130 may be, for example, a cable modem termination system, a satellite modem termination system, or a base station, as well as other types of devices or systems that can pass communication between DCTE 110-113 and network 120 via shared medium 140.

In an embodiment, DCHE 130 may take packets it is sending to one or more DCTE 110-113 and encode them using a Forward Error Correction (FEC) code. These encoded packets form an FEC-frame. The FEC-frame may then be modulated by DCHE 130 using an appropriate modulation technique and code rate. The combination of the modulation type and the code rate is called a modulation and coding scheme (MCS).

In an embodiment, the modulation techniques that DCHE 130 or DCTE 110-113 may use are modulation types that include quadrature phase shift keying (QPSK), amplitude and phase shift keying (APSK), quadrature amplitude modulation (QAM), binary phase shift keying (BPSK), and rotated BPSK such as $\pi/2$-BPSK. The modulation and coding schemes used by DCHE 130 and DCTE 110-113 may be specified by a DVB standard. For example, the DVB-S2 standard specifies that DCHE 130 to DCTE 110-113 (i.e., downstream) communication of the FEC-frame may use: QPSK 1/4; QPSK 1/3; QPSK 2/5; QPSK 1/2; QPSK 3/5; QPSK 2/3; QPSK 3/4; QPSK 4/5; QPSK 5/6; QPSK 8/9; QPSK 9/10; 8PSK 3/5; 8PSK 2/3; 8PSK 3/4; 8PSK 5/6; 8PSK 8/9; 8PSK 9/10; 16APSK 2/3; 16APSK 3/4; 16APSK 4/5; 16APSK 5/6; 16APSK 8/9; 16APSK 9/10; 32APSK 3/4; 32APSK 4/5; 32APSK 5/6; 32APSK 8/9; and, 32APSK 9/10. This list is not exhaustive. It should be understood that other modulation and coding schemes may be used.

Once an FEC-frame is modulated by DCHE 130 according to a selected modulation and coding scheme, it is referred to as a physical layer frame (PL-Frame). A physical layer header (PL-Header) may be prefixed to the PL-Frame before the frame is communicated. The PL-Header is used to synchronize the receiving DCTE 110-113, and communicate information about the PL-Frame such as the modulation and coding scheme of the PL-Frame, and the duration of the PL-Frame. In an embodiment, the PL-Header is modulated using a very robust modulation scheme such as $\pi/2$-BPSK. When a PL-Header and PL-Frame are received, they may be demodulated and decoded. The PL-Frame is demodulated and decoded by DCTEs 110-113 to reconstitute the packets sent by DCHE 130. The contents of these packets may then be inspected by DCTEs 110-113 to determine if they are intended for the receiving DCTE 110-113.

In an embodiment, the PL-Header sent by DCHE 130, and received by DCTE 110-113, may be used to control at least a portion of a DCTE 110-113. The PL-Header sent by DCHE 130 may comprise information that signals whether the associated PL-Frame may carry data intended for a given DCTE 110-113. For example, the PL-Header sent by DCHE 130 may include a group identifier (GID) field. This field may be used to group DCTEs 110-113. These groupings allow a particular DCTE 110-113 to know, by examining the GID field, whether the PL-Frame may be intended for a group to which the particular DCTE 110-113 belongs.

To illustrate, consider a case where DCTE 110 belongs to a group associated with a GID value of 1. DCTE 111 belongs to two groups—the one associated with a GID of 1 and another associated with a GID value of 3. In this case, when DCTE 110 receives a PL-Header with a GID of 1, DCTE 110 would know that the PL-Frame may contain data that was intended for DCTE 110. If the PL-Header was received with a GID of any other value (e.g., 3), then DCTE 110 would know that DCTE 110 may safely ignore that PL-Frame. Likewise, when DCTE 111 receives a PL-Header with a GID of 1 or 3, DCTE 111 would know that the PL-Frame may contain data that was intended for DCTE 111. If the PL-Header was received with a GID of any other value (e.g., 5), then DCTE 111 would know that DCTE 111 may safely ignore that PL-Frame.

In another example, DCTEs 110-113 may use a modulation and coding scheme field in the PL-Header as an indicator of a grouping. In other words, the MCS field may be used to group DCTEs 110-113. These groupings allow a particular DCTE 110-113 to know, by examining the MCS field, whether the PL-Frame may be intended for a group to which the DCTE 110-113 belongs.

To illustrate, consider a case where DCTE 110 belongs to a group that encodes their PL-Frames using QPSK 1/4. DCTE 111 belongs to two groups—the one associated with PL-Frames encoded using QPSK 1/4 and another associated with PL-Frames encoded using 32APSK 9/10. In this case, when DCTE 110 received a PL-Header with an MCS field specifying QPSK 1/4, DCTE 110 would know that the PL-Frame may contain data that was intended for DCTE 110. If the PL-Header specifies any other MCS, then DCTE 110 would know that DCTE 110 may safely ignore that PL-Frame. Likewise, when DCTE 111 received a PL-Header specifying either QPSK 1/4 or 32APSK 9/10, DCTE 111 would know that the PL-Frame may contain data that was intended for DCTE 111. If the PL-Header was received specifying an MCS of any other value (e.g., 8PSK 3/4), then DCTE 111 would know that DCTE 111 may safely ignore that PL-Frame.

DCHE 130 may determine and assign the GIDs or MCS that determine a DCTE's 110-113 grouping. By associating DCTEs 110-113 with more than one GID or MCS, a particular GID or MCS may be defined as a control grouping. In other words, every DCTE 110-113 may be instructed that it is part of a particular GID or MCS and thus it cannot safely ignore PL-Frames with that GID or MCS. For example, a GID of 1 may be defined as the control grouping. Likewise, a robust modulation and coding scheme, such as QPSK 1/4 may be defined as the control grouping. Because all DCTEs 110-113 cannot ignore the control grouping, PL-Frames associated with the control grouping may be used to set the other groupings (i.e., GIDs or MCSs) that a particular DCTE 110-113 cannot safely ignore.

In an embodiment, a DCTE 110-113 may only operate the PL-Frame demodulator and decoding functions when it receives a PL-Frame that, by virtue of the GID or MCS, it cannot safely ignore. Thus, a demodulator and/or decoder that is part of a DCTE 110-113 may be disabled for PL-Frames that can be ignored. The decoder that may be disabled may include the FEC decoder. The demodulator and/or decoder of a DCTE 110-113 may be disabled by a variety of methods that may comprise: a disable signal, gating a clock, removal of a circuit's power supply, or a software branch that executes low power instructions.

In general, circuit power dissipation or consumption is a function of processing frequency and the size of the circuitry. Due to the high frequency associated with demodulating and decoding a PL-frame, disabling demodulator or decoding circuitry may reduce power dissipation significantly. In particular, because the FEC decoder function may be the largest and/or compute intensive function, disabling the FEC decoding function in response to receiving a PL-Header that indicates the PL-Frame may be safely ignored may significantly reduce power dissipation. Likewise, because the demodulation function is also complex, disabling the demodulator function in response to receiving a PL-Header that indicates the PL-Frame may be safely ignored may significantly reduce power dissipation.

Figure 2:
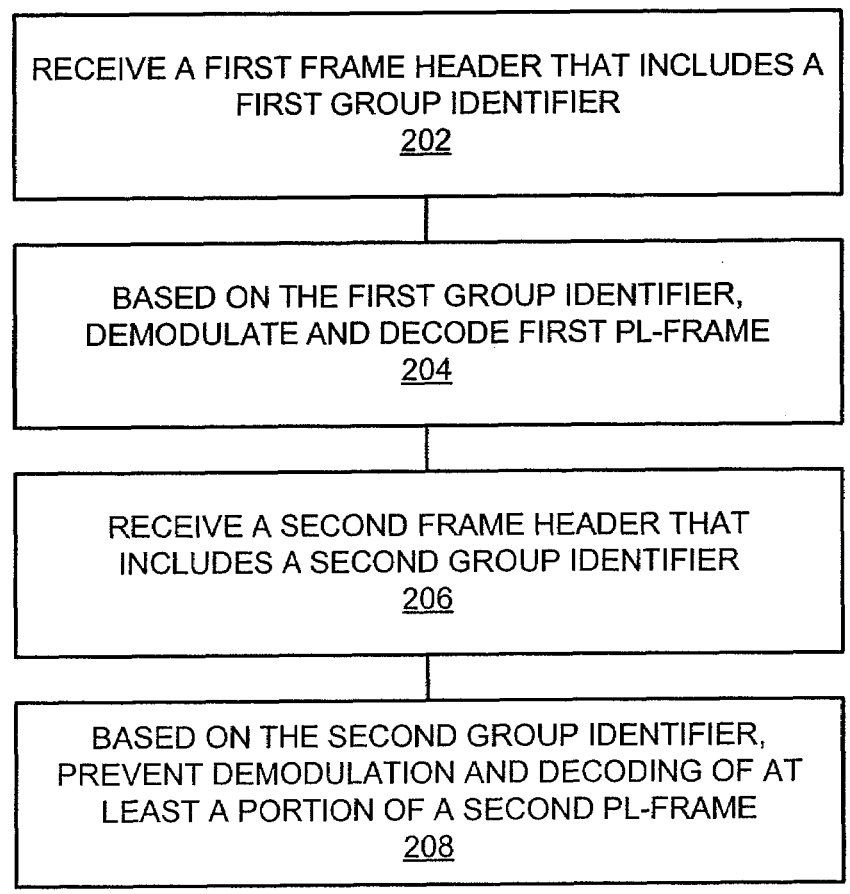
FIG. 2 is a flowchart of a method of controlling a receiver.

FIG. 2 is a flowchart of a method of controlling a receiver. The steps illustrated in FIG. 2 may be performed by one or more elements of communication system 100.

A first frame header is received that includes a first group identifier (202). For example, DCTE 110 may receive a PL-Header that includes a GID associated with DCTE 110. In another example, DCTE 110 may receive a PL-Header that specifies an MCS associated with DCTE 110. Based on first the group identifier, a first PL-Frame is demodulated and decoded (204). For example, based on the GID, DCTE 110 may demodulate and decode a PL-Frame corresponding to the received PL-Header. The decoding may include decoding the FEC-Frame into packets.

A second frame header is received that includes a second group identifier (206). For example, DCTE 110 may receive a PL-Header that includes a GID not associated with DCTE 110. In another example, DCTE 110 may receive a PL-Header that specifies an MCS not associated with DCTE 110. Based on the second group identifier, the demodulation and/or decoding of a second PL-Frame is prevented (208). For example, based on the GID, DCTE 110 may prevent the demodulation and/or decoding of a PL-Frame corresponding to the received PL-Header. Preventing the decoding may include disabling the decoding of the FEC-Frame into packets.

Figure 3:
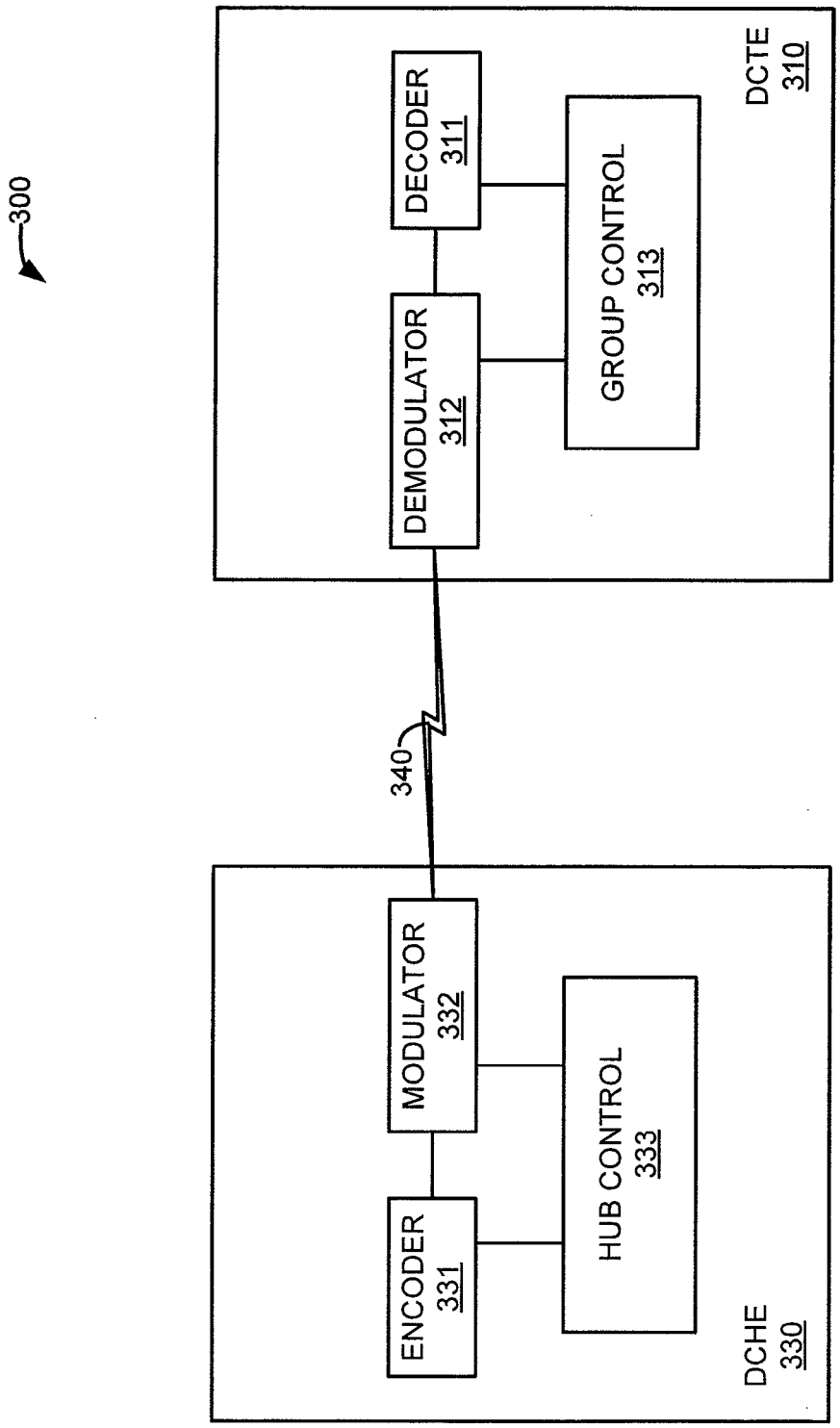
FIG. 3 is a block diagram of a communication system.

FIG. 3 is a block diagram of a communication system. Communication system 300 may perform the functions discussed in association with communication system 100. Likewise, communication system 100 may perform the functions discussed in association with communication system 300. In FIG. 3, communication system 300 comprises: DCTE 310, DCHE 330, and communication link 340. DCHE 330 includes encoder 331, modulator 332, and hub control 333. DCTE 310 includes demodulator 312, decoder 311, and group control 313. DCTE 310 and DCHE 330 are operatively coupled by communication link 340. In particular, modulator 332 of DCHE 330 and demodulator 312 of DCTE 312 are operatively coupled using communication link 340.

Hub control 333 is operatively coupled to encoder 331 and modulator 332. Thus, hub control 333 may send data via communication link 340 in either the PL-Header, PL-Frame, or FEC-Frame, described previously. DCTE 310 includes demodulator 312, decoder 311, and group control 313. Group control 313 is operatively coupled to demodulator 312 and decoder 311. Thus, group control 313 may control (e.g., enable or disable) modulator 312 and/or decoder 311 based on data in either a PL-Header, PL-Frame, or FEC-Frame received via communication link 340.

DCTE 310 may be any device, system, or other such communication platform capable of communicating with DCHE 330 via communication link 340 and includes demodulator 312, decoder 311, and group control 313. DCTE 310 may be, for example, a cable modem, a satellite modem, a mobile phone, a wireless phone, a wireless modem, a wireless USB modem, a personal digital assistant (PDA), as well as other types of devices or systems that can communicate with DCHE 330 via communication link 340.

Communication link 340 may be the physical layer that operatively couples DCTE 310 with DCHE 330. In an example, communication link 340 may be a wireless link that is relayed via a satellite. Thus, DCTE 310 may be a satellite modem. Communication link 340 may operate at a high frequency band such as the Ka band. Communication link 340 may comprise a frequency range that covers several hundred Megahertz to a few Gigahertz. In this case, communication system 300 may be referred to as an ultra-wideband communication system. Communication link 340 may be operated using a single ultra wideband modulated carrier. In another example, communication link 340 may be a cable-TV network. In this example, DCTE 310 would be a cable modem. Communication link 340 may be shared among other devices (not shown) using time division multiplex (TDM) techniques.

DCHE 330 may be device, system, or other such communication platform capable of passing communications to DCTE 310 via communication link 340, and includes encoder 331, modulator 332, and hub control 333. DCHE 330 may be, for example, a cable modem termination system, a satellite modem termination system, or a base station, as well as other types of devices or systems that can pass communication to DCTE 310 via communication link 340.

In an embodiment, a PL-Header sent by DCHE 330 and received by DCTE 310 may be used by DCHE 330 to control at least a portion of a DCTE 310. For example, a PL-Header sent by DCHE 330 may cause group control 313 to disable (or enable) demodulator 312 and/or decoder 311. In another example, data in a PL-Frame or FEC-Frame may cause group control 313 to respond to certain values in a PL-Header. This response may include disabling (or enabling) demodulation 312 and/or decoder 311. A list of GIDs or MCSs that DCTE 310 is supposed to decode and demodulate for further processing is an example of data in a PL-Frame or FEC-Frame that may cause group control 313 to respond in the aforementioned manner. This list may be generated by hub control 333 and appropriately encoded by encoder 331 and modulated by modulator 332. This list may be generated to create groupings that allow group control 313 to disable demodulator 312 and/or decoder 311 to reduce the power consumption of DCTE 310.

The PL-Header sent by DCHE 330 may comprise information that signals whether the associated PL-Frame may carry data intended for DCTE 310. As discussed previously, the PL-Header sent by DCHE 330 as controlled by hub control 333 may include a group identifier (GID) field. This field may be used to tell group control 313 of DCTE 310 which PL-Frames should be fully demodulated and decoded for further processing.

To illustrate, consider a case where DCTE 310 has been instructed by DCHE 330 to fully decode and demodulate PL-Frames corresponding to GID values of 1 and 3. In this case, when DCTE 310 receives a PL-Header with a GID of 1, group control 313 would know that the corresponding PL-Frame should be fully decoded and demodulated. If a PL-Header is received with a GID of any other values (e.g., 2, 4, etc.), then group control 313 would know that the corresponding PL-Frame need not be fully decoded and demodulated. Thus, group control 313 may disable demodulator 312 and/or decoder 311 such that further processing on the received PL-Frame is halted or left incomplete.

In another example, the MCS field may be used to tell group control 313 of DCTE 310 which PL-Frames should be fully demodulated and decoded for further processing. To illustrate, consider a case where DCTE 310 has been instructed by DCHE 330 to fully decode and demodulate PL-Frames corresponding using QPSK 1/4 and 32APSK 9/10. In this case, when DCTE 310 receives a PL-Header with an MCS field specifying QPSK 1/4, group control 313 would know that the corresponding PL-Frame should be fully decoded and demodulated. If a PL-Header is received specifying an MCS of any other values (e.g., 8PSK 3/4), then group control 313 would know that the corresponding PL-Frame need not be fully decoded and demodulated. Thus, group control 313 may disable demodulator 312 and/or decoder 311 such that further processing on the received PL-Frame is halted or left incomplete.

Hub control 333 may determine and assign the GIDs or MCSs that determine which PL-Frames are to be fully decoded and demodulated by DCTE 310. By telling DCTE 310 that it must fully decode and demodulate more than one GID or MCS, a particular GID or MCS may be used to send control information and the others may be used to send regular data intended for DCTE 310.

As discussed previously, group control 313 may disable the operation of demodulator 312 and/or decoder 311 when it receives a PL-Frame that, by virtue of the GID or MCS, it need not fully demodulate and decode. Decoder 311 and demodulator 312 may be disabled by a variety of methods that may comprise: a disable signal, gating a clock, removal of a circuit's power supply, or a software branch.

Figure 4:
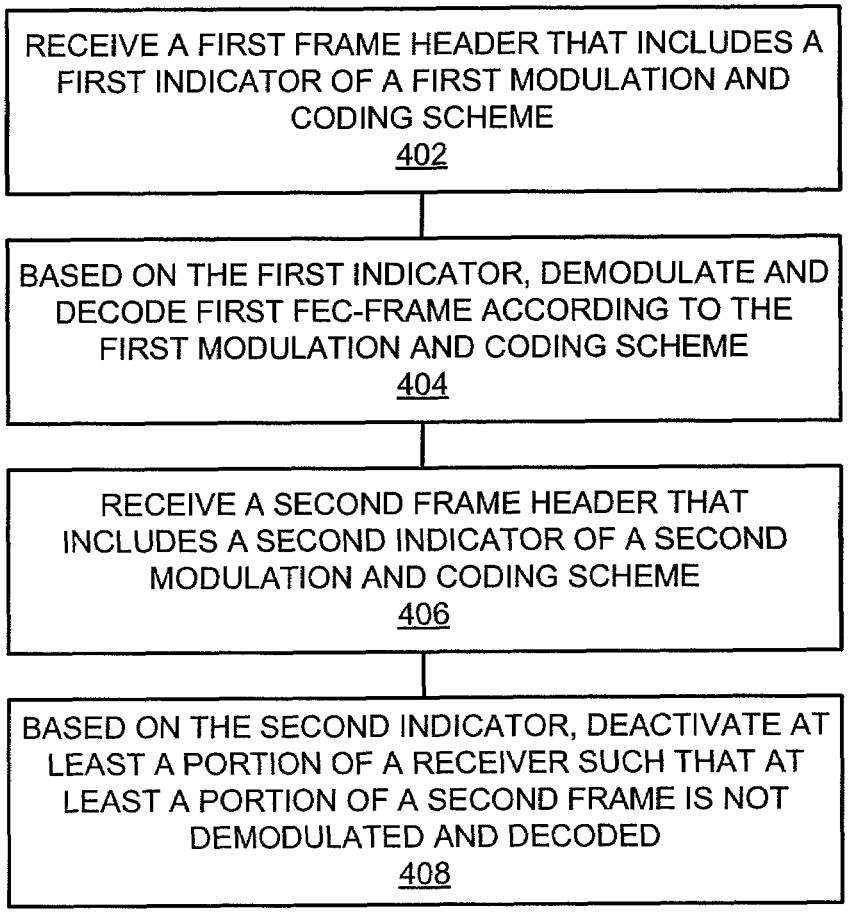
FIG. 4 is a flowchart of a method of controlling a receiver.

FIG. 4 is a flowchart of a method of controlling a receiver. The steps illustrated in FIG. 4 may be performed by one or more elements of communication system 100 or communication system 300. It should also be understood that the steps illustrated in FIG. 4 may be performed with a group identifiers taking the place of, or in addition to, the modulation and coding schemes (and indicators thereof), discussed below.

A first frame header that includes a first indicator of a first modulation and coding scheme is received (402). For example, DCTE 310 may receive a first PL-Header via communication link 340. Demodulator 312 and decoder 311 may demodulate and decode this first PL-Header to determine a first modulation and coding scheme (e.g., QPSK 1/4). Group control 313 may informed of this modulation and coding scheme.

Based on the first indicator, a first PL-Frame is demodulated and decoded according to the first modulation and coding scheme (404). For example, group control 313 may instruct (or allow) demodulator 312 and decoder 311 to fully decode the PL-Frame associated with the first PL-Header. The decision to instruct (or allow) may be based on whether the first modulation and coding scheme is one that DCTE 310 has been instructed by DCHE 330 to demodulate and decode.

A second frame header that includes a second indicator of a second modulation and coding scheme is received (406). For example, DCTE 310 may receive a second PL-Header via communication link 340. Demodulator 312 and decoder 311 may demodulate and decode this second PL-Header to determine a second modulation and coding scheme (e.g., 8PSK 3/4). Group control 313 may informed of this modulation and coding scheme.

Based on the second indicator, at least a portion of a receiver is deactivated such that at least a portion of a second frame is not demodulated and decoded. (408). For example, group control 313 may deactivate (or disable) demodulator 312 and/or decoder 311, thus preventing the full demodulation and/or decoding of the PL-Frame associated with the second PL-Header. The decision to deactivate (or disable) may be based on whether the second modulation and coding scheme is one that DCTE 310 has been instructed by DCHE 330 to demodulate and decode.

Figure 5:
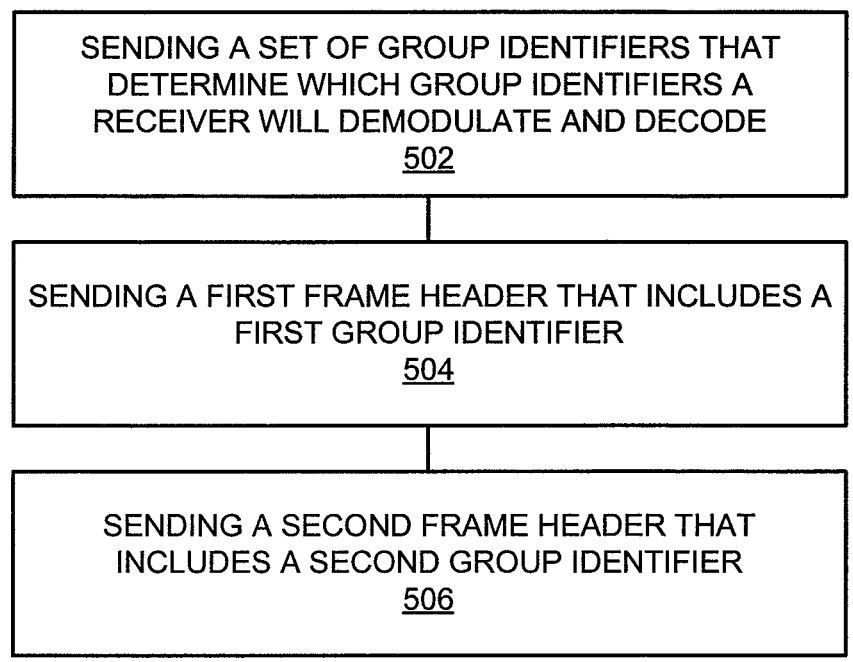
FIG. 5 is a flowchart of a method of controlling a receiver.

FIG. 5 is a flowchart of a method of controlling a receiver. The steps illustrated in FIG. 5 may be performed by one or more elements of communication system 100 or communication system 300. It should also be understood that the steps illustrated in FIG. 5 may be performed with a modulation and coding schemes taking the place of, or in addition to, the group identifiers (and indicators thereof), discussed below.

A set of group identifiers that determine which group identifiers a receiver will demodulate and decode is sent (502). For example, hub control 333 may cause encoder 331 and modulator 332 to send a control message to DCTE 310. This control message may tell DCTE 310 (and group control 313, in particular) which group identifiers that it is required to fully demodulate and decode. (Or, alternatively, which GIDs it is not required to fully demodulate and decode.)

A first frame header that includes a first group identifier is sent (504). For example, hub control 333 may cause DCHE 330 to send a PL-Header that has a GID value that will cause DCTE 310 to fully demodulate and decode the corresponding PL-Frame. In response, group control 313 may cause demodulator 312 and decoder 311 to fully demodulate and decode the PL-Frame.

A second frame header that includes a second group identifier is sent (506). For example, hub control 333 may cause DCHE 310 to send a PL-Header that has a GID value whereby DCTE 310 is not required to fully demodulate and decode the corresponding PL-Frame. In response, group control 313 may deactivate demodulator 312 and decoder 311. This deactivation may result in at least a portion of the PL-Frame not being fully demodulated and decoded.

Figure 6:
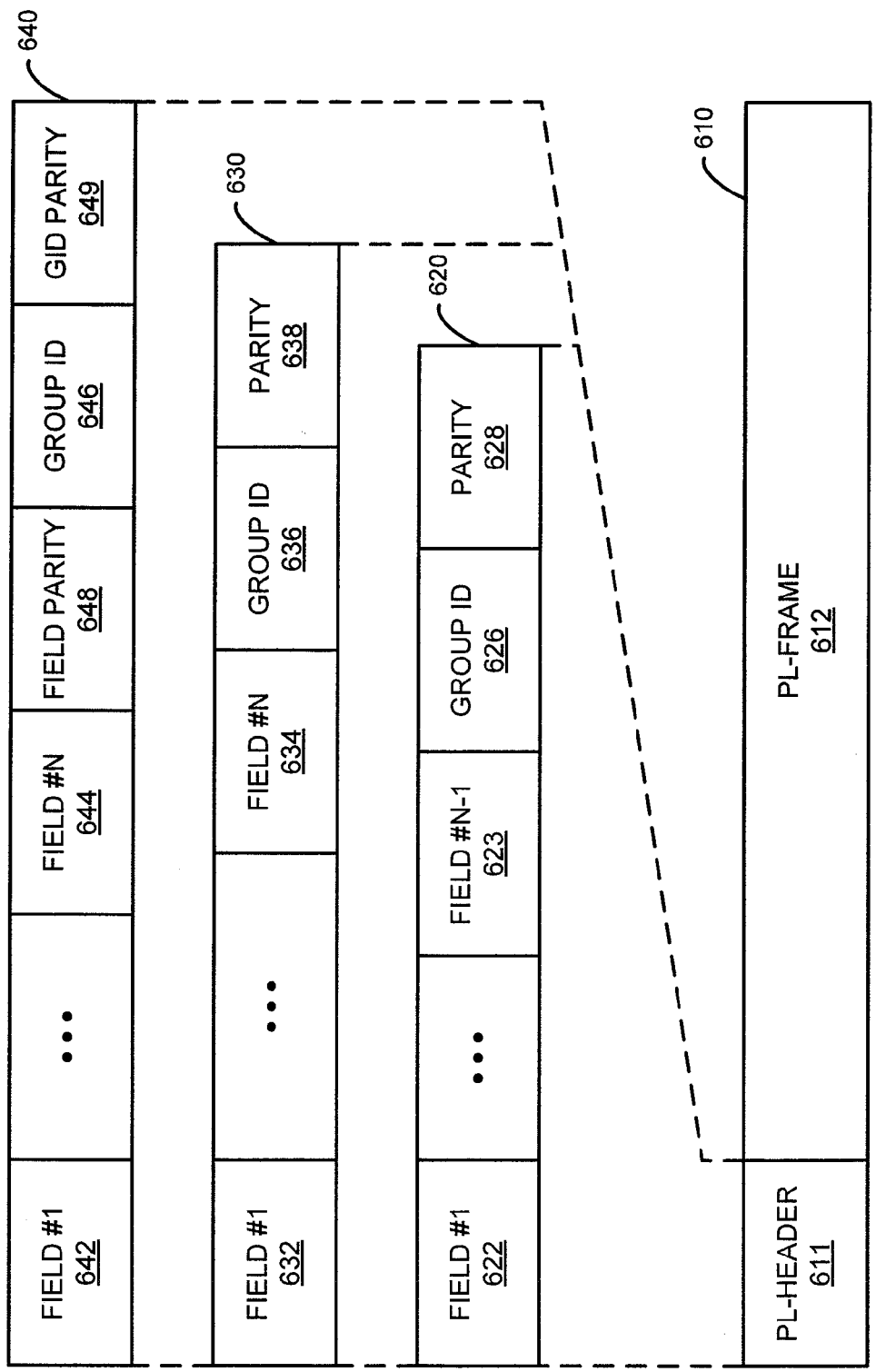
FIG. 6 is an illustration of a physical layer frame and physical layer headers.

FIG. 6 is an illustration of a physical layer frame and physical layer headers. The physical layer headers (i.e., PL-Headers) depicted by FIG. 6 may be used by communication system 100 or communication system 300. In addition, the PL-Headers depicted by FIG. 6 may be used by the methods illustrated in FIGS. 2, 4, and 5.

As shown in FIG. 6 by element 610, a PL-Header 611 precedes a corresponding PL-Frame 612. PL-Header 611 may take several formats 620, 630, or 640. In format 620, PL-Header 611 is comprised of: field #1 622 through field #N−1 623, a group ID 626, and a parity field 628. Format 620 may be used to send a GID without changing the total length of a PL-Header. This format may be used when not all of the information (i.e., fields) are used. For example, a specific application of the DVB-S2 standard may use a reduce number of, or a constant, modulation and coding scheme for the PL-Frames. In this case, the unused fields (bits) that typically help specify the modulation and coding scheme may be used to communicate the GID.

In format 630, PL-Header 611 is comprised of: field #1 632 through field #N 634, a group ID 636, and a parity field 638. This format increases the size of the PL-Header a minimal amount without losing any of the information normally carried by fields #1 through #N. In format 640, PL-Header 611 is comprised of: field #1 642 through field #N 644, a field parity 648, a group ID 646, and a GID parity 649. This format increases the size of the PL-Header more than format 630. However, the additional parity fields prevent the error correcting capabilities from being reduced when compared to format 630.

The methods, systems, networks, devices, equipment, and functions described above may be implemented with or executed by one or more computer systems. The methods described above may also be stored on a computer readable medium. Many of the elements of communication system 100, communication system 300, may be, comprise, or include computers systems. This includes, but is not limited to communication system 100, DCTE 110-113, network 120, DCHE 130, shared medium 140, communication system 300, DCTE 310, decoder 311, demodulator 312, group control 313, DCHE 330, encoder 331, modulator 332, hub control 333, and communication link 340.

Figure 7:
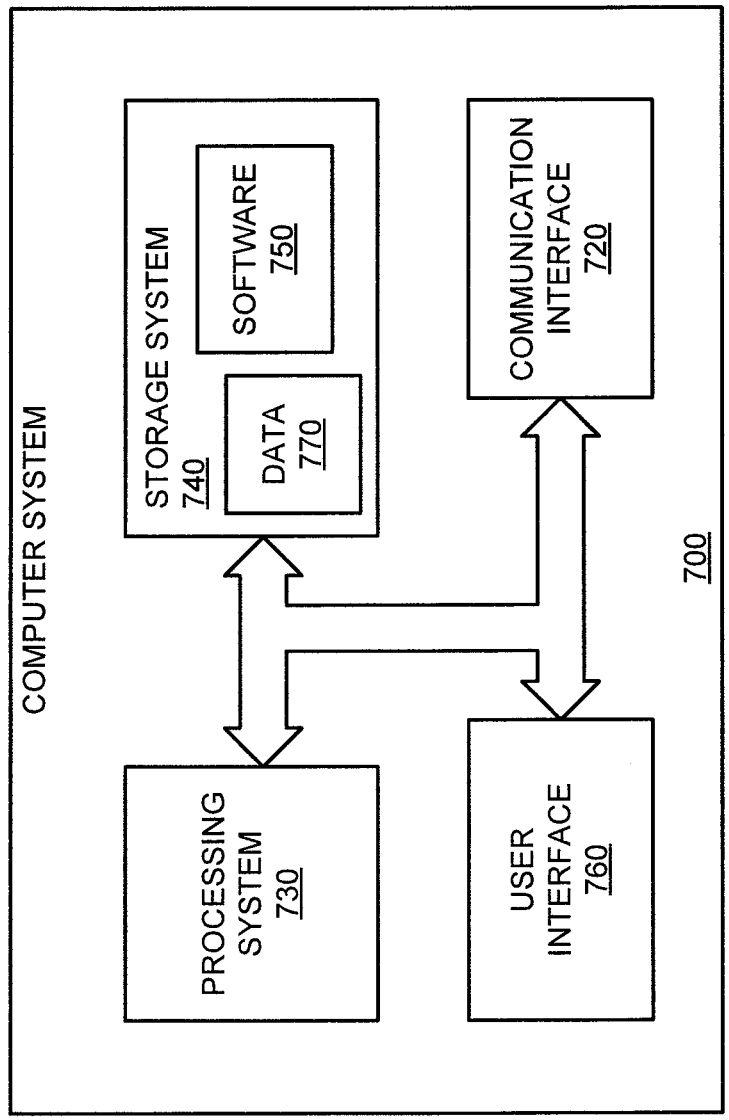
FIG. 7 is a block diagram of a computer system.

FIG. 7 illustrates a block diagram of a computer system. Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, network storage, server, or other memory function. Storage system 740 may be a computer readable medium. Storage system 740 may be distributed among multiple memory devices.

Processing system 730 retrieves and executes software 750 from storage system 740. Processing system may retrieve and store data 770. Processing system may also retrieve and store data via communication interface 720. Processing system 750 may create or modify software 750 or data 770 to achieve a tangible result. Processing system may control communication interface 720 or user interface 770 to achieve a tangible result. Processing system may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

In an embodiment, a method of controlling a receiver, comprises: receiving a first frame header comprising a first indicator and a first group identifier, the first indicator corresponding to a first modulation and coding scheme; based on the first group identifier, demodulating and decoding a first frame according to the first modulation and coding scheme; receiving a second frame header comprising a second group identifier; and, based on the second group identifier, preventing at least a portion of a second frame from being demodulated and decoded.

The first group identifier may be a member of a set of group identifiers associated with the receiver. The method of controlling a receiver may further comprise: receiving an indicator of a set of group identifiers that determines which group identifiers will result in demodulating and decoding the first frame. The first group identifier corresponding to a control group identifier may result in demodulating and decoding the first frame. The demodulating and decoding the first frame may be further based on the first indicator. The preventing at least a portion of a second frame from being demodulated a decoded may be further based on a second indicator corresponding to a second modulation and coding scheme received as part of the second frame header.

In an embodiment, a method of controlling a receiver comprises: receiving a first frame header comprising a first indicator, the first indicator corresponding to a first modulation and coding scheme; based on the first indicator, demodulating and decoding a first frame according to the first modulation and coding scheme; receiving a second frame header comprising a second indicator, the second indicator corresponding to a second modulation and coding scheme; and, based on the second indicator, deactivating at least a portion of the receiver such that at least a portion of a second frame is not demodulated a decoded.

The method of controlling a receiver may further comprise: receiving an indicator of a set of modulation and coding schemes that determines which modulation and coding schemes will result in demodulating and decoding the first frame. The first indicator corresponding to a modulation and coding scheme of a control group may result in demodulating and decoding the first frame. The first frame header may further comprise a first group identifier and the second frame header may further comprise a second group identifier. The deactivating may be further based on the second group identifier. The first group identifier may be a member of a set of group identifiers associated with the receiver. The method of controlling a receiver may further comprise: receiving an indicator of a set of group identifiers that determines which group identifiers will result in demodulating and decoding the first frame.

In an embodiment, a method of controlling a receiver, comprises: sending a first frame header comprising a first indicator and a first group identifier, the first indicator corresponding to a first modulation and coding scheme; and, sending a second frame header comprising a second group identifier.

The first group identifier may be a member of a set of group identifiers associated with the receiver. The method of controlling a receiver may further comprise: sending an indicator of a set of group identifiers that determines which group identifiers will result in demodulating and decoding a first frame, the first frame being associated with the first frame header. The first group identifier corresponding to a control group identifier may result in demodulating and decoding a first frame, the first frame being associated with the first frame header. The first group identifier being associated with the receiver may result in demodulating and decoding a first frame, the first frame being associated with the first frame header. The first group identifier and the first modulation and coding scheme being associated with the receiver may result in demodulating and decoding a first frame, the first frame being associated with the first frame header. The first modulation and coding scheme corresponding to a control group may result in demodulating and decoding the first frame.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of controlling a receiver, comprising:
   receiving a first frame header comprising a first indicator and a first group identifier, said first indicator corresponding to a first modulation and coding scheme;
   based on determining that said first indicator and said first group identifier are both within a control grouping for said receiver, demodulating and decoding a first frame according to said first modulation and coding scheme;
   receiving a second frame header comprising a second indicator and a second group identifier, said second indicator corresponding to a second modulation and coding scheme; and,
   based on determining that said second indicator is outside of said control grouping for said receiver, preventing at least a portion of a second frame from being demodulated and decoded.

2. The method of claim 1, wherein said first group identifier is a member of a set of group identifiers associated with said receiver.

3. The method of claim 1, further comprising:
   receiving a message including a set of group identifiers that determines which group identifiers will result in demodulating and decoding said first frame.

4. The method of claim 1, wherein said control grouping comprises a plurarity of group identifiers and a plurality of indicators of modulation and coding schemes.

5. The method of claim 1, wherein said receiver powers down when said demodulating and decoding on said second frame is prevented.

6. The method of claim 1, wherein said preventing at least a portion of a second frame from being demodulated and decoded is further based on said second group identifier received as part of said second frame header.

7. A method of controlling a receiver, comprising:
   receiving a first frame header comprising a first indicator, said first indicator corresponding to a first modulation and coding scheme;
   based on said first indicator, demodulating and decoding a first frame according to said first modulation and coding scheme;
   receiving a second frame header comprising a second indicator, said second indicator corresponding to a second modulation and coding scheme; and,
   based on said second indicator, deactivating at least a portion of said receiver such that at least a portion of a second frame is not demodulated and decoded.

8. The method of claim 7, further comprising:
   receiving an indicator of a set of modulation and coding schemes that determines which modulation and coding schemes will result in demodulating and decoding said first frame.

9. The method of claim 7, wherein said first indicator corresponding to a modulation and coding scheme of a control group results in demodulating and decoding said first frame.

10. The method of claim 7, wherein the first frame header further comprises a first group identifier and the second frame header further comprises a second group identifier.

11. The method of claim 10, wherein said deactivating is further based on said second group identifier.

12. The method of claim 10, wherein said first group identifier is a member of a set of group identifiers associated with said receiver.

13. The method of claim 10, further comprising:
   receiving a message including a set of group identifiers that determines which group identifiers will result in demodulating and decoding said first frame.

14. The method of claim 1, further comprising:
   determining that said second group identifier is within said control grouping for said receiver.

15. The method of claim 1, wherein said preventing said at least a portion of said second frame from being demodulated and decoded comprises:
   disabling a demodulator at said receiver.

16. The method of claim 1, wherein said preventing said at least a portion of said second frame from being demodulated and decoded comprises:
   disabling a decoder at said receiver.

17. A device comprising:
   a demodulator configured to demodulate received frames;
   a decoder, communicatively coupled with said demodulator, configured to decode said demodulated frames; and
   a group control, communicatively coupled with said demodulator and said decoder, and configured to:
      receive a first indicator and a first group identifier associated with a received frame, said first indicator corresponding to a first modulation and coding scheme;
      determine whether said first group identifier and said first indicator are within a control grouping for said device; and
      disable said demodulator when said determination is that said first indicator is outside of said control grouping.

18. The device of claim 17, wherein,
   said group control determines said first group identifier is within a control grouping for said device before disabling said demodulator.

19. The device of claim 17, wherein,
   the group control disables said decoder when said determination is that said first indicator is outside of said control grouping.

20. The device of claim 17, wherein said frame comprises a physical layer frame.

* * * * *